US008184204B2

(12) United States Patent
Chen

(10) Patent No.: US 8,184,204 B2
(45) Date of Patent: May 22, 2012

(54) DE-RING SYSTEM AND METHOD FOR REDUCING THE OVERSHOOTING AND UNDERSHOOTING OF VIDEO SIGNAL IN A SCALER

(75) Inventor: Chian-Wen Chen, Taipei (TW)

(73) Assignee: Sunplus Technology Co., Ltd (TW)

(*) Notice: Subject to any disclaimer, the term of this patent is extended or adjusted under 35 U.S.C. 154(b) by 383 days.

(21) Appl. No.: 12/654,981

(22) Filed: Jan. 12, 2010

(65) Prior Publication Data

US 2011/0037898 A1 Feb. 17, 2011

(30) Foreign Application Priority Data

Aug. 14, 2009 (TW) .............................. 98127355 A

(51) Int. Cl.
*H04N 5/21* (2006.01)

(52) U.S. Cl. ........ 348/627; 382/266; 382/275; 348/628; 348/629

(58) Field of Classification Search .................. 348/607, 348/618–631; 382/260, 266, 269, 275

See application file for complete search history.

(56) References Cited

U.S. PATENT DOCUMENTS

| | | | | |
|---|---|---|---|---|
| 4,939,576 | A * | 7/1990 | Campbell | 348/607 |
| 7,110,044 | B2 * | 9/2006 | Wang et al. | 348/627 |
| 7,339,601 | B2 * | 3/2008 | Kim | 345/690 |
| 7,876,973 | B2 * | 1/2011 | Fairbanks et al. | 382/263 |
| 2008/0152017 | A1 * | 6/2008 | Vendrig et al. | 375/240.27 |

* cited by examiner

*Primary Examiner* — Michael Lee

(74) *Attorney, Agent, or Firm* — Bacon & Thomas

(57) ABSTRACT

In a de-ring system for reducing the overshooting and undershooting of a video signal after scaling on the horizontal and the vertical direction in a scaler, a region judgment device receives the video signal and detects the attributes of the region in the video signal. When the region in the video signal is an edge and flat area, the de-ring system adjusts the weighting coefficient to increase the low frequency components for reducing the overshooting and undershooting of the video signal. When the region in the video signal is neither an edge nor an edge and flat area, the de-ring system adjusts the weighting coefficient to increase the high frequency components for preserving the high frequency components of the video signal, so as to dramatically reduce the overshooting and undershooting of a video signal.

20 Claims, 5 Drawing Sheets

DE-RING SYSTEM AND METHOD FOR REDUCING THE OVERSHOOTING AND UNDERSHOOTING OF VIDEO SIGNAL IN A SCALER

BACKGROUND OF THE INVENTION

1. Field of the Invention

The present invention relates to the field of image processing and, more particularly, to a de-ring system and method for reducing the overshooting and undershooting of video signal in a scaler.

2. Description of Related Art

The resolution of a video source is usually a fixed value in a liquid crystal television. Thus, the image of a video source has to be properly scaled for display in panels with different resolutions. U.S. Pat. No. 5,739,867 granted to Eglit for a "Method and apparatus for upscaling an image in both horizontal and vertical directions" has disclosed an image scaling technique for use in a liquid crystal display.

In the process of scaling, a filter is usually used to perform the scaling operation. Because of the filter, overshooting or undershooting is likely to appear in the image after filtering during the image processing. Thus, a ringing is easily generated in the process of scaling.

A method for deringing is provided in the specification Annex F of MPEG4. The maximum and the minimum of the whole image block is obtained first, and a threshold value is obtained based on the maximum and the minimum. Then, the method determines whether each pixel of the image block needs to perform deringing based on the threshold value, and if it needs, a weighted mask operation is performed for the pixel to smooth the pixel and its adjacent pixels.

However, MPEG4 only discloses the typical deringing technique. When the typical deringing technique is applied to the scaler, high frequency signals may be attenuated, resulting in, for example, blurring the edge of image, or a line buffer has to be added after the scaler to deal with new data. Therefore, it is desirable to provide a deranging system and method to mitigate and/or obviate the aforementioned problems.

SUMMARY OF THE INVENTION

The object of the present invention is to provide a de-ring system and method for reducing the overshooting and undershooting of a video signal in a scaler, to exactly judge the region in the video signal. When the region in the video signal is an edge and flat area, the de-ring system adjusts the weighting coefficient to be 0.5 to increase the low frequency components for reducing the overshooting and undershooting of the video signal. Meanwhile, the high frequency components could be kept.

According to a feature of the invention, the invention provides a de-ring system for reducing the overshooting and undershooting of a video signal in a scaler, which performs a first directional and a second directional filtering on a video signal to reduce the overshooting and undershooting of a video signal after the first directional and the second directional filtering, the de-ring system comprises a first directional linear filter, a first directional filter with high/medium frequency boost, a first directional region judgment device, a first directional clamping device, and a first mixer. A first directional linear filter receives a video signal to perform a first directional scaling on pixels in the video signal and generates a first directional linear filtering signal. A first directional filter with high/medium frequency boost receives the video signal to perform the first directional scaling and frequency boosting on pixels in the video signal and generates a first directional frequency boosting filtering signal. A first directional region judgment device receives the video signal and judges the region in the video signal to generate a first adjustment coefficient. A first directional clamping device receives the video signal and connects to the first directional filter with high/medium frequency boost for performing clamping operation on the first directional frequency boosting filtering signal based on the maximum and the minimum of pixels in the video signal, and generating a first directional clamping signal. A first mixer connects to the first directional filter with high/medium frequency boost, the first directional clamping device and the first directional region judgment device for adjusting weight of the first directional frequency boosting filtering signal and the first directional clamping signal based on the first adjustment coefficient, and generating a first directional output signal.

According to a feature of the invention, the invention provides a de-ring method for reducing the overshooting and undershooting of a video signal in a scaler, which performs a first directional and a second directional filtering on a video signal to reduce the overshooting and undershooting of a video signal after the first directional and the second directional filtering. The de-ring method comprises the steps of: (A) receiving the video signal to perform a first directional scaling on pixels in the video signal and generating a first directional linear filtering signal; (B) receiving the video signal to perform a first directional scaling and frequency boosting on pixels in the video signal and generating a first directional frequency boosting filtering signal; (C) receiving the video signal and judging the region in the video signal to generate a first adjustment coefficient; (D) receiving the video signal and the first directional frequency boosting filtering signal, performing clamping operation on the first directional frequency boosting filtering signal based on the maximum and the minimum, and generating a first directional clamping signal; and (E) adjusting weight of the first directional frequency boosting filtering signal and the first directional clamping signal based on the first adjustment coefficient, and generating a first directional output signal.

DETAILED DESCRIPTION OF THE PREFERRED EMBODIMENT

Figure 1:
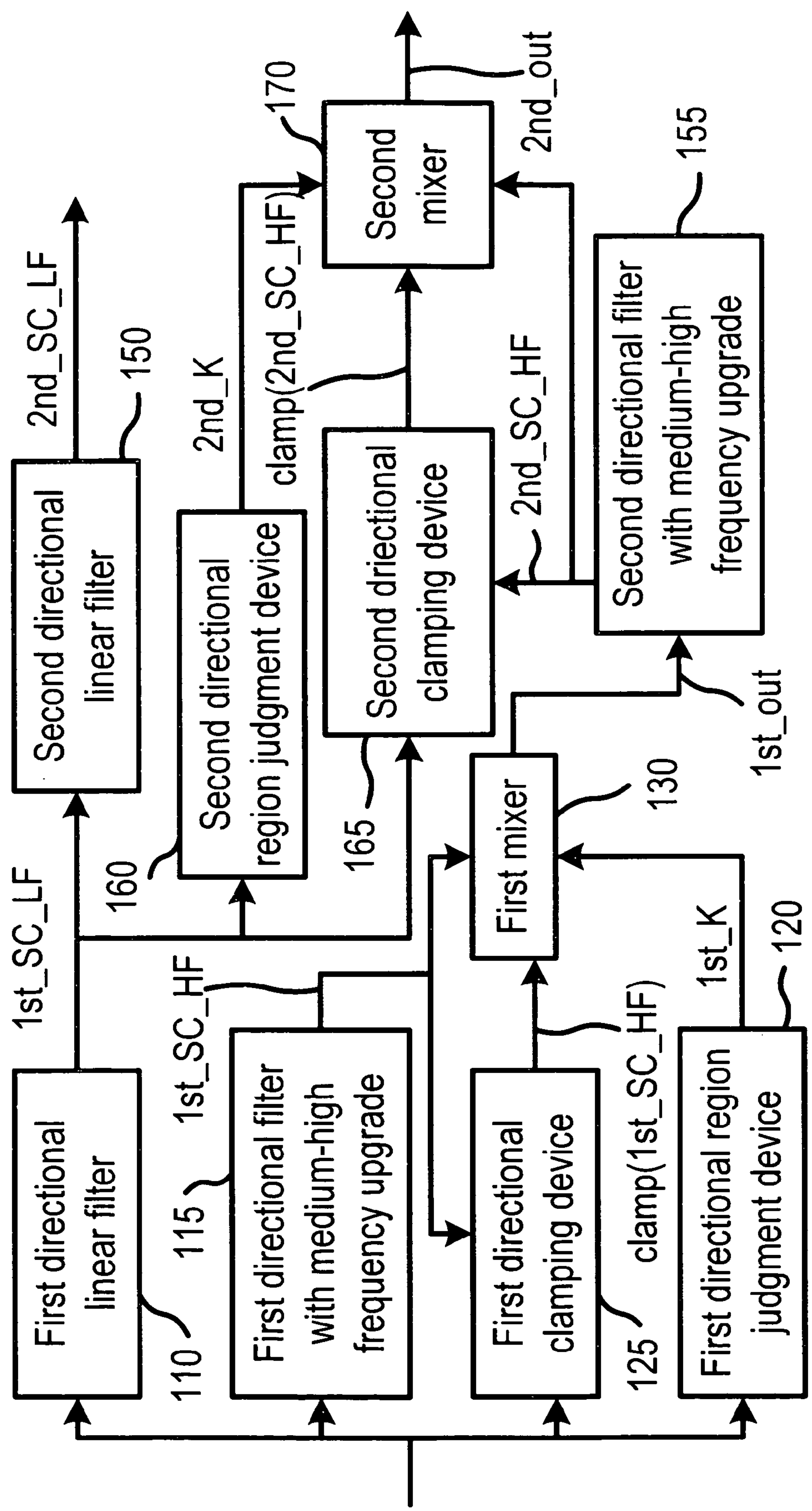
FIG. 1 is a block diagram of the de-ring system for reducing the overshooting and undershooting of a video signal in a scaler according to the present invention.

FIG. 1 is a block diagram of the de-ring system for reducing the overshooting and undershooting of a video signal in a scaler according to the present invention. The de-ring system 100 performs a first directional filtering and a second directional filtering on a video signal and reduces the ringing of the video signal after the first directional filtering and the second directional filtering, wherein the first direction and the second direction are perpendicular to each other. The first direction is preferably the horizontal direction, and the second direction is preferably the vertical direction.

The de-ring system 100 comprises: a first directional linear filter 110, a first directional filter 115 with high/medium frequency boost, a first directional region judgment device 120, a first directional clamping device 125, and a first mixer 130, so as to perform the first directional filtering to reduce the ringing in the first direction. The de-ring system 100 further comprises: a second directional linear filter 150, a second directional filter 155 with high/medium frequency boost, a second directional region judgment device 160, a second directional clamping device 165, and a second mixer 170, so as to perform the second directional filtering to reduce the ringing in the second direction.

The first directional linear filter 110 receives a video signal to perform a first directional scaling on pixels in the video signal and generates a first directional linear filtering signal 1st_SC_LF.

The first directional filter 115 with high/medium frequency boost receives the video signal to perform the first directional scaling and frequency boosting on pixels in the video signal and generates a first directional frequency boosting filtering signal 1st_SC_HF.

Figure 2:
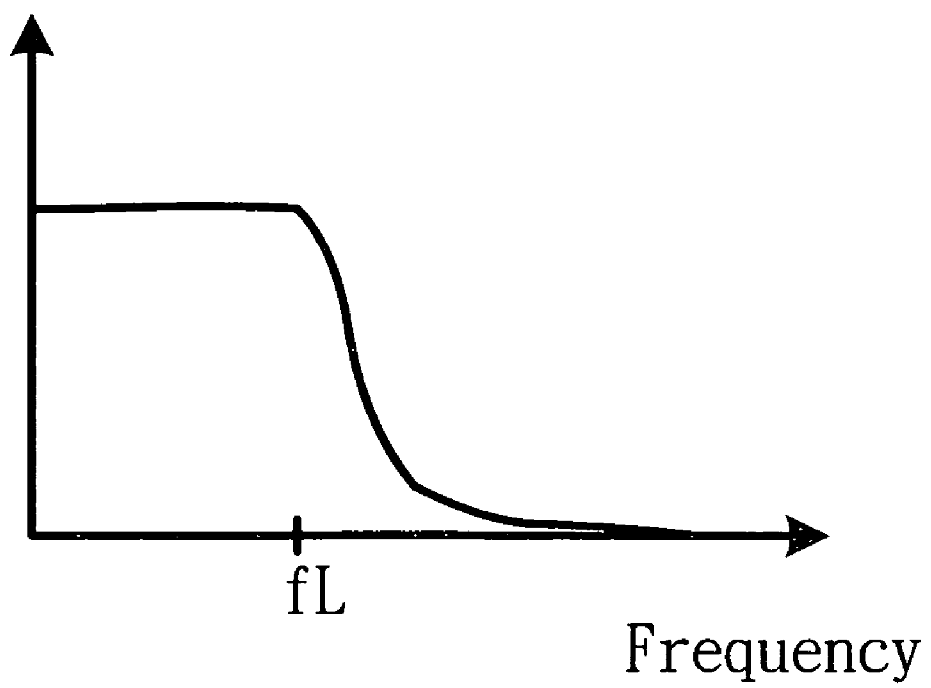
FIG. 2 is a schematic diagram of frequency response of the first directional linear filter according to the present invention.

FIG. 2 is a schematic diagram of frequency response of the first directional linear filter according to the present invention. As shown in FIG. 2, the first directional linear filter 110 performs the first directional scaling on the pixels of the video signal by a low-pass filter.

Figure 3:
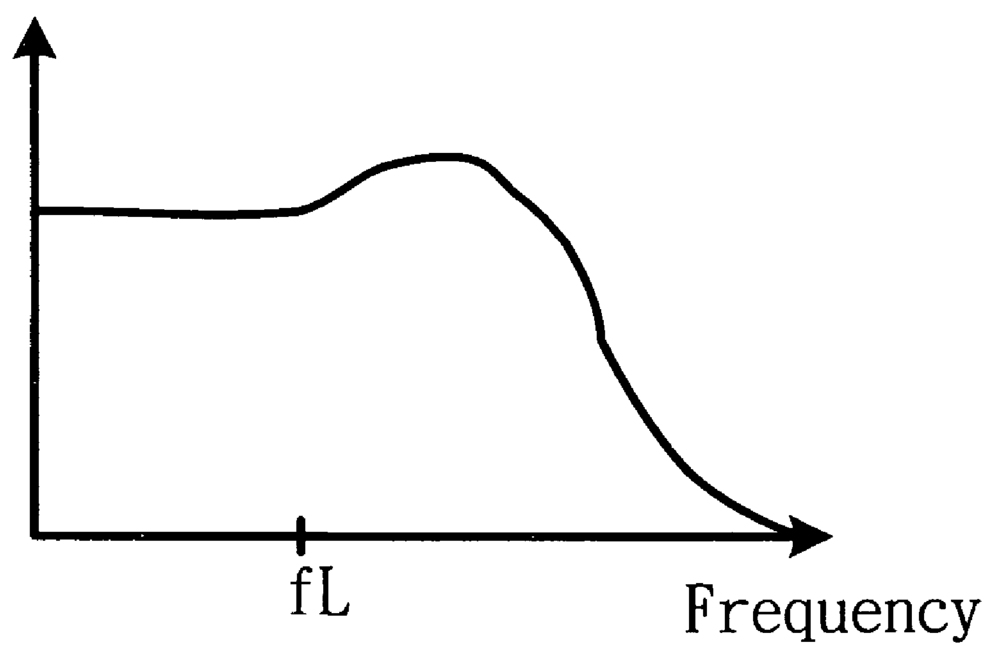
FIG. 3 is a schematic diagram of frequency response of the first directional filter with high/medium frequency boost according to the present invention.

FIG. 3 is a schematic diagram of frequency response of the first directional filter with high/medium frequency boost according to the present invention. As shown in FIG. 3, the gain of the first directional filter 115 with high/medium frequency boost is increased, instead of being decreased, when exceeding a low-pass frequency $F_1$, and thus, the high/medium frequency components, such as edge, of output signal would be increased to keep the high/medium frequency components in the video signal. The first directional filter 115 with high/medium frequency boost is preferably a Hermit filter with a peaking filter to generate the frequency response in FIG. 3, and also can be other filter to achieve the frequency response in FIG. 3.

The first directional region judgment device 120 receives the video signal and judges the region in the video signal to generate a first adjustment coefficient 1st_K.

The first adjustment coefficient 1st_K is 0 when the region in the video signal is a flat area. The first adjustment coefficient 1st_K is 0.5 when the region in the video signal is an edge area plus a flat area. The first adjustment coefficient 1st_K is 1 when the region in the video signal is not a flat area or an edge area plus a flat area.

Figure 4:
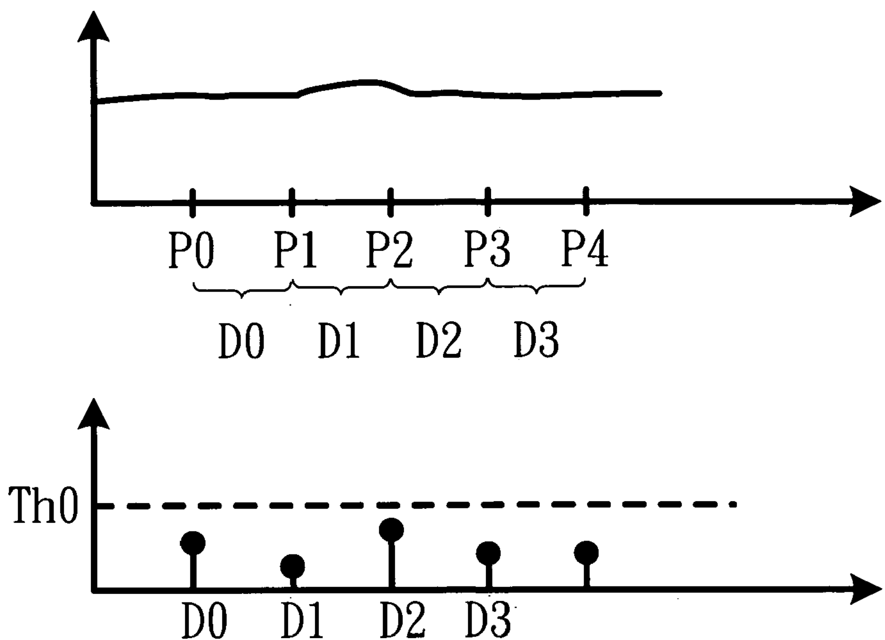
FIG. 4 is a schematic diagram of operation of the first directional region judgment device according to the present invention.

FIG. 4 is a schematic diagram of operation of the first directional region judgment device according to the present invention. As shown in FIG. 4, if the difference between a pixel and its adjacent pixels in the video signal is smaller than a first threshold value Th0, it indicates that the pixel is in a flat area. For example, the absolute difference D0 between the pixel P0 and the pixel P1, the absolute difference D1 between the pixel P1 and the pixel P2, and son on are each smaller than the first threshold value Th0, it indicates that the region in the video signal is a flat region.

Figure 5:
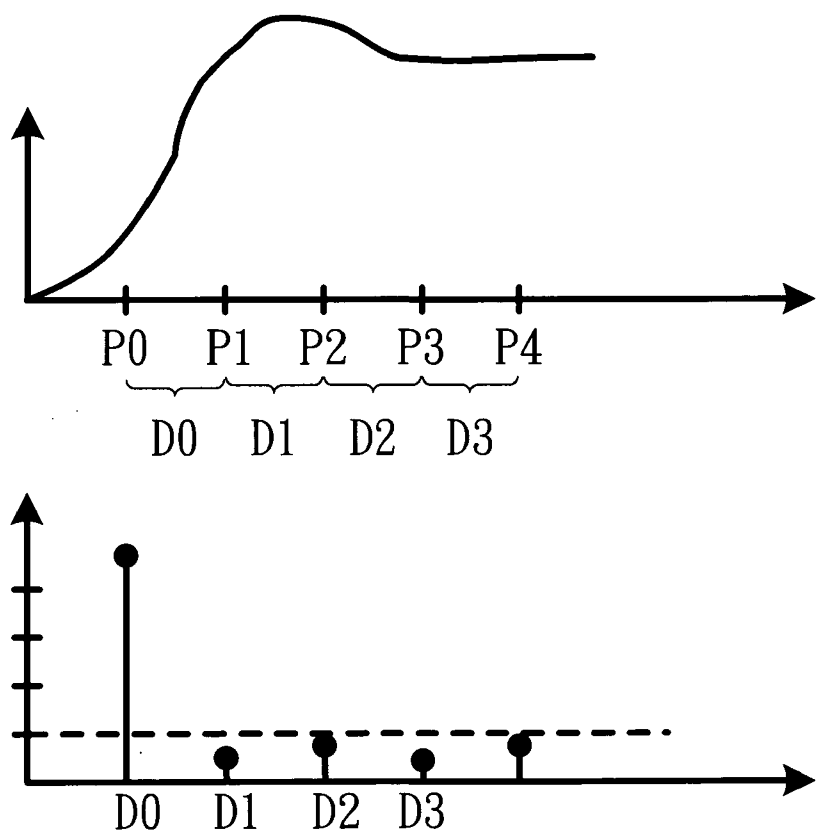
FIG. 5 is another schematic diagram of operation of the first directional region judgment device according to the present invention.

FIG. 5 is another schematic diagram of operation of the first directional region judgment device according to the present invention. If the difference between a pixel and its adjacent pixels in the video signal is smaller than a quarter of the maximum of the difference between the pixel and its adjacent pixels, the pixel is in the edge area plus a flat area. For example, as shown in FIG. 5, the absolute difference D1 between the pixel P1 and the pixel P2, the absolute difference D2 between the pixel P2 and the pixel P3, and so on are each smaller than a quarter of the maximum absolute difference D0 between the pixel P0 and the pixel P1, and it indicates that the region in the video signal is a flat region plus an edge area.

The first directional clamping device 125 receives the video signal and connects to the first directional filter 115 with high/medium frequency boost for performing clamping operation on the first directional frequency boosting filtering signal 1st_SC_HF based on the maximum and the minimum of pixels in the video signal, so as to generate a first directional clamping signal clamp1st_SC_HF.

Figure 6:
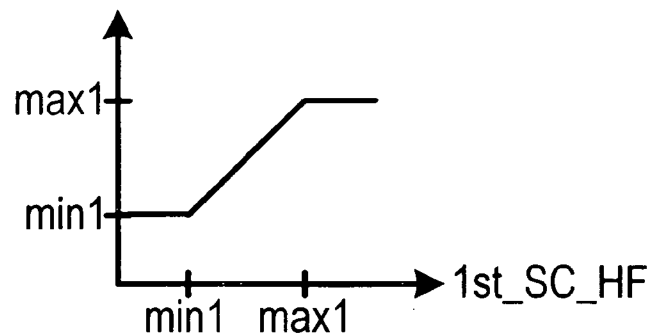
FIG. 6 is a schematic diagram of operation of the first directional clamping device according to the present invention.

FIG. 6 is a schematic diagram of operation of the first directional clamping device according to the present invention. When the first directional frequency boosting filtering signal 1st_SC_HF is larger than the maximum max1 of a pixel and its adjacent pixels in the video signal, the first directional clamping device 125 outputs the maximum max1 as the first directional clamping signal clamp(1st_SC_HF). When the first directional frequency boosting filtering signal 1st_SC_HF is smaller than the minimum min1 of a pixel and its adjacent pixels in the video signal, the first directional clamping device 125 outputs the minimum min1 as the first directional clamping signal clamp 1st_SC_HF.

The first mixer 130 connects to the first directional filter 115 with high/medium frequency boost, the first directional clamping device 125 and the first directional region judgment device 120, and adjusts weight of the first directional frequency boosting filtering signal 1st_SC_HF and the first directional clamping signal clamp(1st_SC_HF) based on the first adjustment coefficient 1st_K, so as to generate a first directional output signal 1st_out.

The first mixer 130 generates the first directional output signal 1st_out based on the following equation:

$$1st\_K \times 1st\_SC\_HF + (1 - 1st\_K) \times clamp(1st\_SC\_HF),$$

where 1st_K is the first adjustment coefficient, 1st_SC_HF is the first directional frequency boosting filtering signal, clamp (1st_SC_HF) is the first directional clamping signal.

The first adjustment coefficient 1st_K is 0 when the region in the video signal is a flat area, namely, the first directional output signal 1st_out is clamp(1st_SC_HF) when the region in the video signal is a flat area. The first adjustment coefficient 1st_K is 0.5 when the region in the video signal is an edge area plus a flat area, namely, the first directional output signal 1st_out is 0.5×1st_SC_HF+0.5×clamp(1st_SC_HF) when the region in the video signal is an edge area plus a flat area. The first adjustment coefficient 1st_K is 1 when the region in the video signal is not a flat area or an edge area plus a flat area. Namely, the first directional output signal 1st_out is the first directional frequency boosting filtering signal 1st_SC_HF when the region in the video signal is not a flat area or an edge area plus a flat area.

Figure 7A:
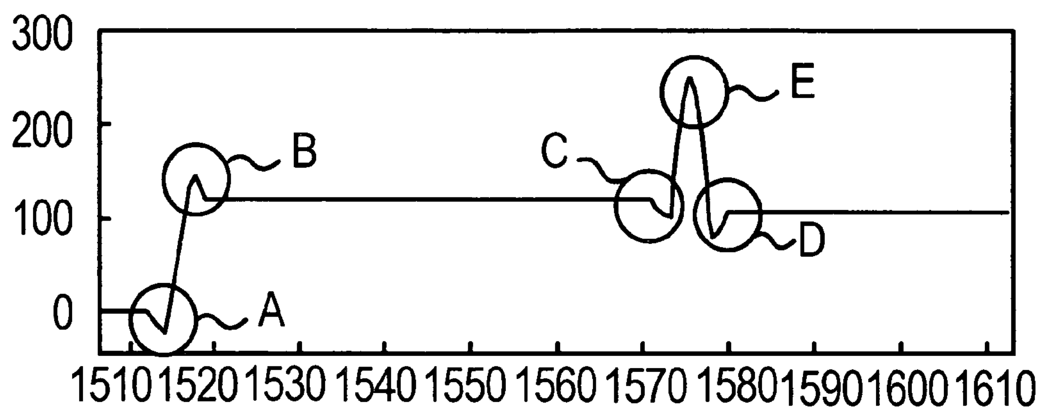
FIGS. 7(A) and 7(B) illustrate a comparison between the video signals with and without being processed by the de-ring system for reducing the overshooting and undershooting of a video signal in a scaler according to the present invention.
Figure 7B:
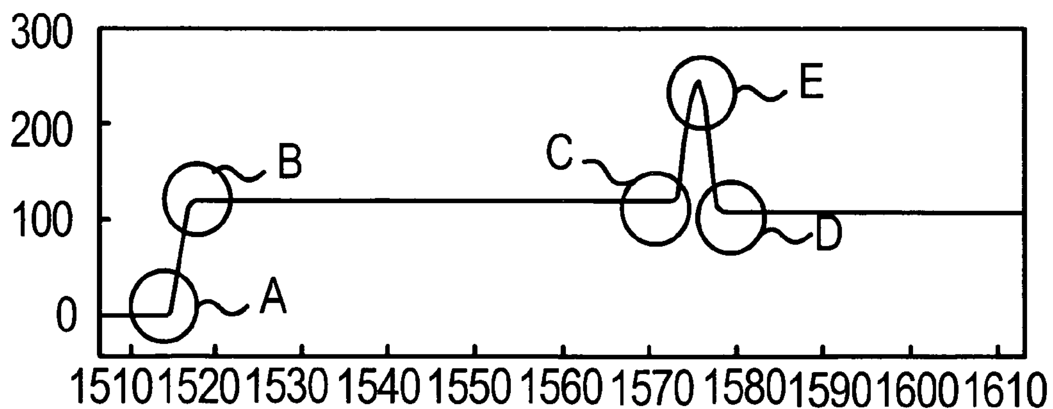

FIG. 7 illustrates a comparison between a video signal without being processed by the de-ring system for reducing the overshooting and undershooting of a video signal in a scaler, as in FIG. 7(A), and a video signal which has been processed by the de-ring system for reducing the overshooting and undershooting of a video signal in a scaler according to the present invention, as in FIG. 7(B). According to FIGS. 7(A) and 7(B), the areas of the circles A, B, C, D are edge areas plus flat areas, and thus the first adjustment coefficient 1st_K of being 0.5 is used to increase the low frequency components, so as to reduce the overshooting and undershooting of the first directional output signal 1st_out. The area of the circle E is not a flat area or an edge area plus a flat area, and thus the first adjustment coefficient 1st_K of being 1 is used to keep the high frequency components without causing a depression.

The second directional linear filter 150 connects to the first directional linear filter 110 to perform the second directional scaling on the pixels in the first directional linear filtering signal 1st_SC_LF, and generates a second directional linear filtering signal 2nd_SC_LF. As shown in FIG. 2, the second directional linear filter 150 could perform the second directional scaling on pixels in the first directional linear filtering signal 1st_SC_LF by a low-pass filter, wherein, the first direction is horizontal direction, and the second direction is vertical direction.

The second directional filter 155 with high/medium frequency boost connects to the first mixer 130, and receives the first directional output signal 1st_out to perform the second directional scaling and frequency boosting on pixels in the first directional output signal 1st_out, so as to generate a second directional frequency boosting filtering signal 2nd_SC_HF. As shown in FIG. 3, second directional filter 155 with high/medium frequency boost could be a Hermit filter with a peaking filter to generate the frequency response in FIG. 3.

The second directional region judgment device 160 connects to the first directional linear filter 110, and judges the region in the first directional linear filtering signal 1st_SC_LF to generate a second adjustment coefficient 2nd_K.

The second directional clamping device 165 connects to the first directional linear filter 110 and the second directional filter 155 with high/medium frequency boost, and performs clamping operation on the second directional frequency boosting filtering signal 2nd_SC_HF based on the maximum and the minimum in the first directional linear filtering signal 1st_SC_LF, so as to generate a second directional clamping signal clamp(2nd_SC_HF).

The second mixer 170 connects to the second directional filter 155 with high/medium frequency boost, the second directional clamping device 165, and the second directional region judgment device 160, and adjusts weight of the second directional frequency boosting filtering signal 2nd_SC_HF and the second directional clamping signal clamp(2nd_SC_HF) based on the second adjustment coefficient 2nd_K, so as to generate a second directional output signal 2nd_out.

The second adjustment coefficient 2nd_K is 0 when the first directional linear filtering signal 1st_SC_LF is a flat area. The second adjustment coefficient 2nd_K is 0.5 when the first directional linear filtering signal 1st_SC_LF is an edge area plus a flat area. The second adjustment coefficient 2nd_K is 1 when the first directional linear filtering signal 1st_SC_LF is not a flat area or an edge area plus a flat area. The operation of the second directional clamping device 165 is similar to the first directional clamping device 125. Please also refer to FIG. 6. When the second directional frequency boosting filtering signal 2nd_SC_HF is larger than the maximum max2 of a pixel and its adjacent pixels in the first directional linear filtering signal 1st_SC_LF, the second directional clamping device 165 outputs the maximum max2 as the second directional clamping signal clamp(2nd_SC_HF). When the second directional frequency boosting filtering signal 2nd_SC_HF is smaller than the minimum min2 of a pixel and its adjacent pixels in the first directional linear filtering signal 1st_SC_LF, the second directional clamping device 165 outputs the minimum min2 as the second directional clamping signal clamp(2nd_SC_HF).

The second mixer 170 generates the second directional output signal based on the following equation:

$$2nd\_K \times 2nd\_SC\_HF + (1 - 2nd\_K) \times clamp(2nd\_SC\_HF),$$

where 2nd_K is the second adjustment coefficient, 2nd_SC_HF is the second directional frequency boosting filtering signal, clamp(2nd_SC_HF) is the second directional clamping signal.

Figure 8:
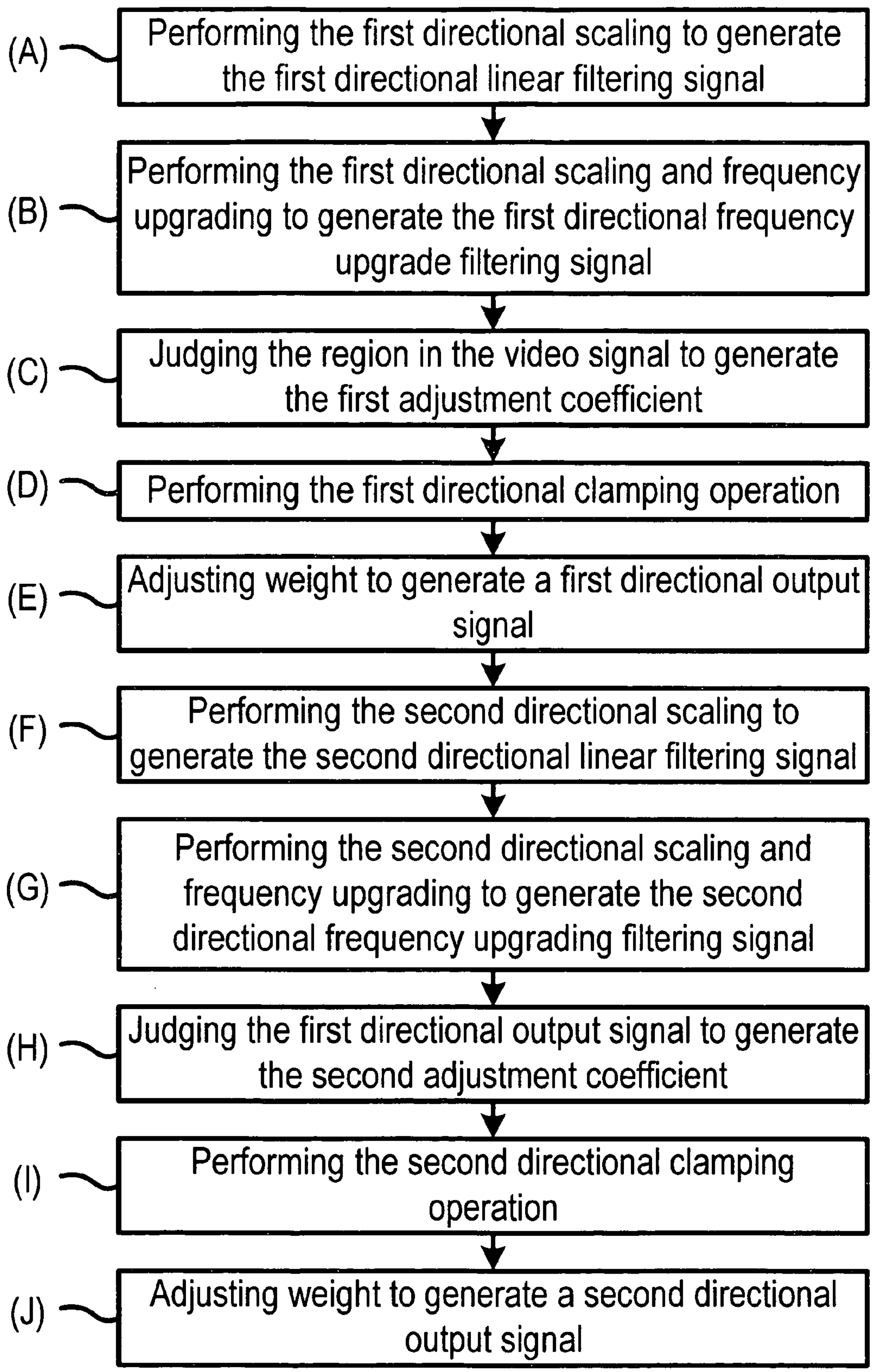
FIG. 8 is a schematic diagram of the de-ring method for reducing the overshooting and undershooting of a video signal in a scaler according to the present invention.

FIG. 8 is a schematic diagram of the de-ring method for reducing the overshooting and undershooting of a video signal in a scaler according to the present invention, which performs a first directional and a second directional filtering on a video signal to reduce the ringing of a video signal after a first directional filtering and a second directional filtering. First, step (A) receives a video signal, and performs a first directional scaling on pixels in the video signal to generate a first directional linear filtering signal 1st_SC_LF.

Step (B) receives the video signal to perform a first directional scaling and frequency boosting on pixels in the video signal for generating a first directional frequency boosting filtering signal 1st_SC_HF.

Step (C) receives the video signal and judges the region in the video signal to generate a first adjustment coefficient 1st_K, wherein, the first adjustment coefficient 1st_K is 0 when the region in the video signal is a flat area, the first adjustment coefficient 1st_K is 0.5 when the region in the video signal is an edge area plus a flat area, and the first adjustment coefficient 1st_K is 1 when the region in the video signal is not a flat area or an edge area plus a flat area. If the difference between a pixel and its adjacent pixels in the video signal is smaller than a first threshold value Th0, it indicates that the pixel is in a flat area. If the difference between a pixel and its adjacent pixels in the video signal is smaller than a quarter of the maximum of the difference between the pixel and its adjacent pixels, the pixel is in the edge area plus a flat area.

Step (D) receives the video signal and the first directional frequency boosting filtering signal 1st_SC_HF, and performs clamping operation on the first directional frequency boosting filtering signal 1st_SC_HF based on the maximum and the minimum for generating a first directional clamping signal clamp 1st_SC_HF.

Step (E) adjusts weight of the first directional frequency boosting filtering signal 1st_SC_HF and the first directional clamping signal clamp1st_SC_HF based on the first adjustment coefficient 1st_K, so as to generate a first directional output signal 1st_out.

Step (F) performs a second directional scaling on pixels in the first directional linear filtering signal 1st_SC_LF to generate a second directional linear filtering signal 2nd_SC_LF.

Step (G) receives the first directional output signal 1st_out to perform a second directional scaling and frequency boosting on pixels in the first directional output signal 1st_out, and generating a second directional frequency boosting filtering signal 2nd_SC_HF.

Step (H) judges the region in the first directional linear filtering signal 1st_SC_LF to generate a second adjustment coefficient 2nd_K. The second adjustment coefficient 2nd_K is 0 when the first directional linear filtering signal 1st_SC_LF is a flat area. The second adjustment coefficient 2nd_K is 0.5 when the first directional linear filtering signal 1st_SC_LF is an edge area plus a flat area. The second adjustment coefficient 2nd_K is 1 when the first directional linear filtering signal 1st_SC_LF is not a flat area or an edge area plus a flat area.

Step (I) performs clamping operation on the second directional frequency boosting filtering signal 2nd_SC_HF based on the maximum and the minimum in the first directional linear filtering signal 1st_SC_LF, and generates a second directional clamping signal clamp(2nd_SC_HF).

Step (J) adjusts weight of the second directional frequency boosting filtering signal 2nd_SC_HF and the second directional clamping signal clamp(2nd_SC_HF) based on the second adjustment coefficient 2nd_K, and generates a second directional output signal.

Thus, the present invention can be performed only in the first direction to reduce the ringing, and it also can be performed in the second direction to reduce the ringing after being performed in the first direction. The first direction is preferably the horizontal direction, and the second direction is preferably the vertical direction.

In the scaling process, the first directional linear filter 110 and the second directional linear filter 150 may produce the ringing and affect the quality of the image signal. The present invention can accurately judge the region in the video signal by the first directional region judgment device 120 and the second directional region judgment device 150, so as to reduce or eliminate the ringing in the video signal, which may be produced after scaling through the first directional linear filter 110 and the second directional linear filter 150.

Preferably, the first directional linear filter 110, the first directional filter 115 with high/medium frequency boost, the first directional region judgment device 120, the first directional clamping device 125, the first mixer 130, the second directional linear filter 150, the second directional filter 155 with high/medium frequency boost, the second directional region judgment device 160, the second directional clamping device 165, and the second mixer 170 can be integrate to a scaler of a single chip to increase the additional features of the scaler.

Therefore, the present invention can accurately judge the region in the video signal by the first directional region judgment device 120 and the second directional region judgment device 150, and set the first and second adjustment coefficients as 0.5 when the region in the video signal is an edge area plus a flat area, so as to increase the low-frequency components. Thus, the overshooting and undershooting of a video signal can be reduced. Further, the present invention sets the first and second adjustment coefficients as 1 when the region in the video signal is not a flat area or an edge area plus a flat area, so as to keep the high frequency components without causing a depression. Thus, the overshooting and undershooting of a video signal produced by using filters can be effectively filtered out.

Although the present invention has been explained in relation to its preferred embodiment, it is to be understood that many other possible modifications and variations can be made without departing from the scope of the invention as hereinafter claimed.

What is claimed is:

1. A de-ring system for reducing overshooting and undershooting of a video signal in a scaler, comprising:

a first directional linear filter for receiving the video signal to perform a first directional scaling on pixels in the video signal and generating a first directional linear filtering signal;

a first directional filter with high/medium frequency boost for receiving the video signal to perform a first directional scaling and frequency boosting on pixels in the video signal and generating a first directional frequency boosting filtering signal;

a first directional region judgment device for receiving the video signal and judging the region in the video signal to generate a first adjustment coefficient;

a first directional clamping device for receiving the video signal and being connected to the first directional filter with high/medium frequency boost to perform clamping operation on the first directional frequency boosting filtering signal based on a maximum and a minimum of pixels in the video signal, and generate a first directional clamping signal; and a first mixer connected to the first directional filter with high/medium frequency boost, the first directional clamping device and the first directional region judgment device for adjusting weight of the first directional frequency boosting filtering signal and the first directional clamping signal based on the first adjustment coefficient, and generating a first directional output signal.

2. The de-ring system as claimed in claim 1, further comprising:

a second directional linear filter connected to the first directional linear filter to perform a second directional scaling and generate a second directional linear filtering signal;

a second directional filter with high/medium frequency boost connected to the first mixer for receiving the first directional output signal to perform a second directional scaling and frequency boosting on pixels in the first directional output signal and generating a second directional, frequency boosting filtering signal;

a second directional region judgment device connected to the first directional linear filter for judging the region in the first directional linear filtering signal to generate a second adjustment coefficient;

a second directional clamping device connected to the first directional linear filter and the second directional filter with high/medium frequency boost for performing clamping operation on the second directional frequency boosting filtering signal based on a maximum and a minimum in the first directional linear filtering signal, and generating a second directional clamping signal; and a second mixer connected to the second directional filter with high/medium frequency boost, the second directional clamping device and the second directional region judgment device for adjusting weight of the second directional frequency boosting filtering signal and the second directional clamping signal based on the second adjustment coefficient, and generating a second directional output signal.

3. The de-ring system as claimed in claim 2, wherein the first adjustment coefficient is 0 when the region in the video signal is a flat area, the first adjustment coefficient is 0.5 when the region in the video signal is an edge area plus a flat area, and the first adjustment coefficient is 1 when the region in the video signal is not a flat area nor an edge area plus a flat area.

4. The de-ring system as claimed in claim 3, wherein the second adjustment coefficient is 0 when the first directional linear filtering signal is a flat area, the second adjustment coefficient is 0.5 when the first directional linear filtering signal is an edge area plus a flat area, and the second adjustment coefficient is 1 when the first directional linear filtering signal is not a flat area or an edge area plus a flat area.

5. The de-ring system as claimed in claim 4, wherein, if the video signal or the difference between the pixel and its adjacent pixels in the first directional linear filtering signal is smaller than a first threshold value, the pixel is in a flat area.

6. The de-ring system as claimed in claim 5, wherein, if the video signal or the difference between the pixel and its adjacent pixels in the first directional linear filtering signal is smaller than a quarter of a maximum of the difference between the pixel and its adjacent pixels, the pixel is in the edge area plus a flat area.

7. The de-ring system as claimed in claim 6, wherein, when the first directional frequency boosting filtering signal is larger than the maximum of the pixel and its adjacent pixels in the video signal, the first directional clamping device outputs the maximum as the first directional clamping signal, and when the first directional frequency boosting filtering signal is smaller than the minimum of the pixel and its adjacent pixels in the video signal, the first directional clamping device outputs the minimum as the first directional clamping signal.

8. The de-ring system as claimed in claim 7, wherein, when the second directional frequency boosting filtering signal is larger than the maximum of the pixel and its adjacent pixels in the first directional linear filtering signal, the second directional clamping device outputs the maximum as the second directional clamping signal, and when the second directional frequency boosting filtering signal is smaller than the minimum of the pixel and its adjacent pixels in the first directional linear filtering signal, the second directional clamping device outputs the minimum as the second directional clamping signal.

9. The de-ring system as claimed in claim 8, wherein the first mixer generates the first directional output signal based on the following equation:

$$1st\_K \times 1st\_SC\_HF + (1 - 1st\_K) \times clamp(1st\_SC\_HF),$$

where 1st_K is the first adjustment coefficient, 1st_SC_HF is the first directional frequency boosting filtering signal, and clamp(1st_SC_HF) is the first directional clamping signal.

10. The de-ring system as claimed in claim 9, wherein the second mixer generates the second directional output signal based on the following equation:

$$2nd\_K \times 2nd\_SC\_HF + (1 - 2nd\_K) \times clamp(2nd\_SC\_HF),$$

where 2nd_K is the second adjustment coefficient, 2nd_SC_HF is the second directional frequency boosting filtering signal, clamp(2nd_SC_HF) is the second directional clamping signal.

11. A de-ring method for reducing the overshooting and undershooting of a video signal in a scaler, comprising the steps of:

(A) receiving the video signal to perform a first directional scaling on pixels in the video signal and generating a first directional linear filtering signal;

(B) receiving the video signal to perform a first directional scaling and frequency boosting on pixels in the video signal and generating a first directional frequency boosting filtering signal;

(C) receiving the video signal and judging the region in the video signal to generate a first adjustment coefficient;

(D) receiving the video signal and the first directional frequency boosting filtering signal, performing clamping operation on the first directional frequency boosting filtering signal based on a maximum and a minimum of pixels in the video signal, and generating a first directional clamping signal; and (E) adjusting weight of the first directional frequency boosting filtering signal and the first directional clamping signal based on the first adjustment coefficient, and generating a first directional output signal.

12. The de-ring method as claimed in claim 11, further comprising the steps of:

(F) performing a second directional scaling on pixels in the first directional linear filtering signal to generate a second directional linear filtering signal;

(G) receiving the first directional output signal to perform the second directional scaling and frequency boosting on pixels in the first directional output signal and generating a second directional frequency boosting filtering signal;

(H) judging the region in the first directional linear filtering signal to generate a second adjustment coefficient;

(I) performing clamping operation on the second directional frequency boosting filtering signal based on a maximum and a minimum in the first directional linear filtering signal, and generating a second directional clamping signal; and (J) adjusting weight of the second directional frequency boosting filtering signal and the second directional clamping signal based on the second adjustment coefficient, and generating a second directional output signal.

13. The de-ring method as claimed in claim 12, wherein, the first adjustment coefficient is 0 when the region in the video signal is a flat area, the first adjustment coefficient is 0.5 when the region in the video signal is an edge area plus a flat area, and the first adjustment coefficient is 1 when the region in the video signal is not a flat area nor an edge area plus a flat area.

14. The de-ring method as claimed in claim 13, wherein the second adjustment coefficient is 0 when the first directional linear filtering signal is a flat area, the second adjustment coefficient is 0.5 when the first directional linear filtering signal is an edge area plus a flat area, and the second adjustment coefficient is 1 when the first directional linear filtering signal is not a flat area or an edge area plus a flat area.

15. The de-ring method as claimed in claim 14, wherein, if the video signal or the difference between a maximum and a minimum of a pixel and its adjacent pixels in the first directional linear filtering signal is smaller than a first threshold value, the pixel is in a flat area.

16. The de-ring method as claimed in claim 15, wherein, if the video signal or the difference between the pixel and its adjacent pixels in the first directional linear filtering signal is smaller than a quarter of a maximum of the difference between the pixel and its adjacent pixels, the pixel is in the edge area plus a flat area.

17. The de-ring method as claimed in claim 16, wherein, when the first directional frequency boosting filtering signal is larger than the maximum of the pixel and its adjacent pixels in the video signal, the maximum is outputted as the first directional clamping signal, and when the first directional frequency boosting filtering signal is smaller than the minimum of the pixel and its adjacent pixels in the video signal, the minimum is outputted as the first directional clamping signal.

18. The de-ring method as claimed in claim 17, wherein, when the second directional frequency boosting filtering signal is larger than the maximum of the pixel and its adjacent pixels in the first directional linear filtering signal, the maximum is outputted as the second directional clamping signal, and when the second directional frequency boosting filtering signal is smaller than the minimum of the pixel and its adjacent pixels in the first directional linear filtering signal, the minimum is outputted as the second directional clamping signal.

19. The de-ring method as claimed in claim 18, wherein the first directional output signal is generated based on the following equation:

$$1st\_K \times 1st\_SC\_HF + (1 - 1st\_K) \times clamp(1st\_SC\_HF),$$

where 1st_K is the first adjustment coefficient, 1st_SC_HF is the first directional frequency boosting filtering signal, and clamp(1st_SC_HF) is the first directional clamping signal.

20. The de-ring method as claimed in claim 19, wherein the second directional output signal is generated based on the following equation:

$$2nd\_K \times 2nd\_SC\_HF + (1 - 2nd\_K) \times clamp(2nd\_SC\_HF),$$

where 2nd_K is the second adjustment coefficient, 2nd_SC_HF is the second directional frequency boosting filtering signal, and clamp(2nd_SC_HF) is the second directional clamping signal.

* * * * *